US012477435B2

(12) United States Patent
Alasti et al.

(10) Patent No.: US 12,477,435 B2
(45) Date of Patent: Nov. 18, 2025

(54) O-RAN BASED DYNAMIC TERRESTRIAL AND NON-TERRESTRIAL INTRA g_Node_B HANDOVER

(71) Applicant: DISH Wireless L.L.C., Englewood, CO (US)

(72) Inventors: Mehdi Alasti, Arlington, VA (US); Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 433 days.

(21) Appl. No.: 18/298,651

(22) Filed: Apr. 11, 2023

(65) Prior Publication Data
US 2024/0349156 A1    Oct. 17, 2024

(51) Int. Cl.
*H04W 36/32*    (2009.01)
*H04W 36/08*    (2009.01)

(52) U.S. Cl.
CPC ....... *H04W 36/322* (2023.05); *H04W 36/083* (2023.05)

(58) Field of Classification Search
CPC . H04W 36/322; H04W 36/083; H04W 36/13; H04W 48/18; H04W 36/087; H04W 48/20; H04W 36/32
See application file for complete search history.

(56) References Cited

U.S. PATENT DOCUMENTS

| 2022/0070746 A1* | 3/2022 | Yiu | H04W 36/362 |
| 2022/0132383 A1* | 4/2022 | Shrestha | H04W 36/0061 |
| 2023/0239036 A1* | 7/2023 | Vivanco | H04L 5/0062 |
| | | | 455/11.1 |

FOREIGN PATENT DOCUMENTS

WO    2023/013540 A1    2/2023

OTHER PUBLICATIONS

Azari, M. Mahdi, et al. "Evolution of non-terrestrial networks from 5G to 6G: A survey." IEEE communications surveys & tutorials 24.4 (2022): 2633-2672. (Year: 2022) (Year: 2022) (Year: 2022) (Year: 2022) (Year: 2022) (Year: 2022).*

(Continued)

*Primary Examiner* — Sharad Rampuria
(74) *Attorney, Agent, or Firm* — Seed Intellectual Property Law Group LLP

(57) ABSTRACT

Systems and methods are described herein for utilizing dynamic terrestrial and non-terrestrial intra gNodeB handover in a wireless network. A location of a user device connecting to the network is determined. In response to the user device being located within a terrestrial-only coverage area of the network, the user device is connected to a terrestrial cell within the terrestrial-only coverage area. In response to the user device being located within a boundary area of the network, a terrestrial cell in the boundary area is selected and a cluster associated with that terrestrial cell is identified. The user device is connected to that terrestrial cell based on that cluster. But in response to the user device being located within a non-terrestrial-only coverage area of the network, a cluster associated with a terrestrial cell within the boundary area closest to the user device is identified, and the user device is connected to a non-terrestrial cell based on that cluster.

18 Claims, 8 Drawing Sheets

(56) References Cited

OTHER PUBLICATIONS

International Search Report and Written Opinion for PCT Application No. PCT/US2024/023581, dated Jul. 26, 2024, 18 pages.
ITL, "Discussion on NTN-TN Mobility," 3GPP TSG RAN WG2 Meeting, Aug. 17-29, 2022, 6 pages.
MediaTek Inc., Thales, "Mobility for NTN-TN scenarios," 3GPP TSG-RAN WG2 Meeting, Nov. 1-12, 2021, 6 pages.

* cited by examiner

O-RAN BASED DYNAMIC TERRESTRIAL AND NON-TERRESTRIAL INTRA g_Node_B HANDOVER

BACKGROUND

Smart phones are being used by more and more people. As the use of smart phones has increased, so too has the desire for more reliable, fast, and continuous transmission of content. In an effort to improve content transmission, networks continue to improve with faster speeds, increased bandwidth, and broader coverage area. The increase in the number of smart phones, however, has also resulted in increased cellular traffic. To account for increased traffic, many networks continuously add additional cell towers. But as people move around, cell towers need to handover service of smart phones to other cell towers, such as when a smart phone is too far from a current cell or when the current cell is experiencing too much traffic. The ability to accurately handover service may be impacted as people move around and go in and out of network coverage areas. It is with respect to these and other considerations that the embodiments described herein have been made.

BRIEF SUMMARY

Embodiments are generally directed to systems and methods for utilizing dynamic terrestrial and non-terrestrial intra gNodeB handover in a wireless network. The wireless network is a combination of one or more terrestrial networks and one or more non-terrestrial networks. User devices communicating with the wireless network may be in a terrestrial coverage area or a non-terrestrial coverage area. A terrestrial coverage area is a market (e.g., the Chicago market) covered by a terrestrial network. And a non-terrestrial coverage area is an area that is covered by a non-terrestrial network.

The non-terrestrial coverage area is often large enough to cover multiple terrestrial coverage areas (e.g., one or more markets), as well as an area outside of terrestrial coverage areas. Thus, it is possible for a non-terrestrial coverage area to cover multiple terrestrial coverage areas and other areas not covered by a terrestrial coverage area. The other areas covered by a non-terrestrial coverage area, but not covered by a terrestrial coverage area, are referred to herein as a non-terrestrial-only coverage area. Thus, the non-terrestrial-only coverage area is an area in which user devices can communicate with a non-terrestrial network but cannot communicate with a terrestrial network.

The terrestrial coverage area includes an inner coverage area and an outer coverage area. The outer coverage area is referred to herein as the boundary area. The boundary area is an area in which user devices can communicate with a terrestrial network via terrestrial cells that are adjacent to the non-terrestrial-only coverage area. The inner coverage area is referred to herein to as the terrestrial-only coverage area. The terrestrial-only coverage area does not mean that there is no "non-terrestrial coverage." Rather, the terrestrial-only coverage area is an area in which user devices can communicate with the terrestrial network via terrestrial cells that are not included in the boundary area, regardless of coverage by a non-terrestrial network. Thus, the terrestrial cells in the terrestrial-only coverage area are not adjacent to the non-terrestrial-only coverage area.

Briefly, a wireless network is logically separated into a terrestrial-only coverage area, a non-terrestrial-only coverage area, and a boundary area. The boundary area includes terrestrial cells that are logically separated into a plurality of clusters, where each cluster includes a plurality of terrestrial cells that proximate to one another and are adjacent to the non-terrestrial-only coverage area. Each cluster also has a dedicated central unit for managing connections with user devices for terrestrial cells in that cluster. Each of the central units for the different clusters is also mapped to a non-terrestrial cell. When a user device connects to a terrestrial cell in the boundary area, the cluster associated with that terrestrial cell is identified and the connection is anchored according to that cluster. For example, the connection is anchored using the central unit dedicated for that cluster. When a user device connects to the non-terrestrial cell in the non-terrestrial-only coverage area, the cluster associated with a terrestrial cell closest to the user device is identified and the connect is anchored according to that cluster. In this way, handovers between terrestrial cells in the boundary area and the non-terrestrial cell, as well as between terrestrial cells in the same cluster, can maintain the same central unit and perform an intra gNodeB handover.

Embodiments described herein improve the efficiency of wireless networks. By using cluster-specific connections in a boundary area between a terrestrial-only coverage area and a non-terrestrial-only coverage area, handovers save computing resources by reducing the number of changes in connection anchors within the network.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
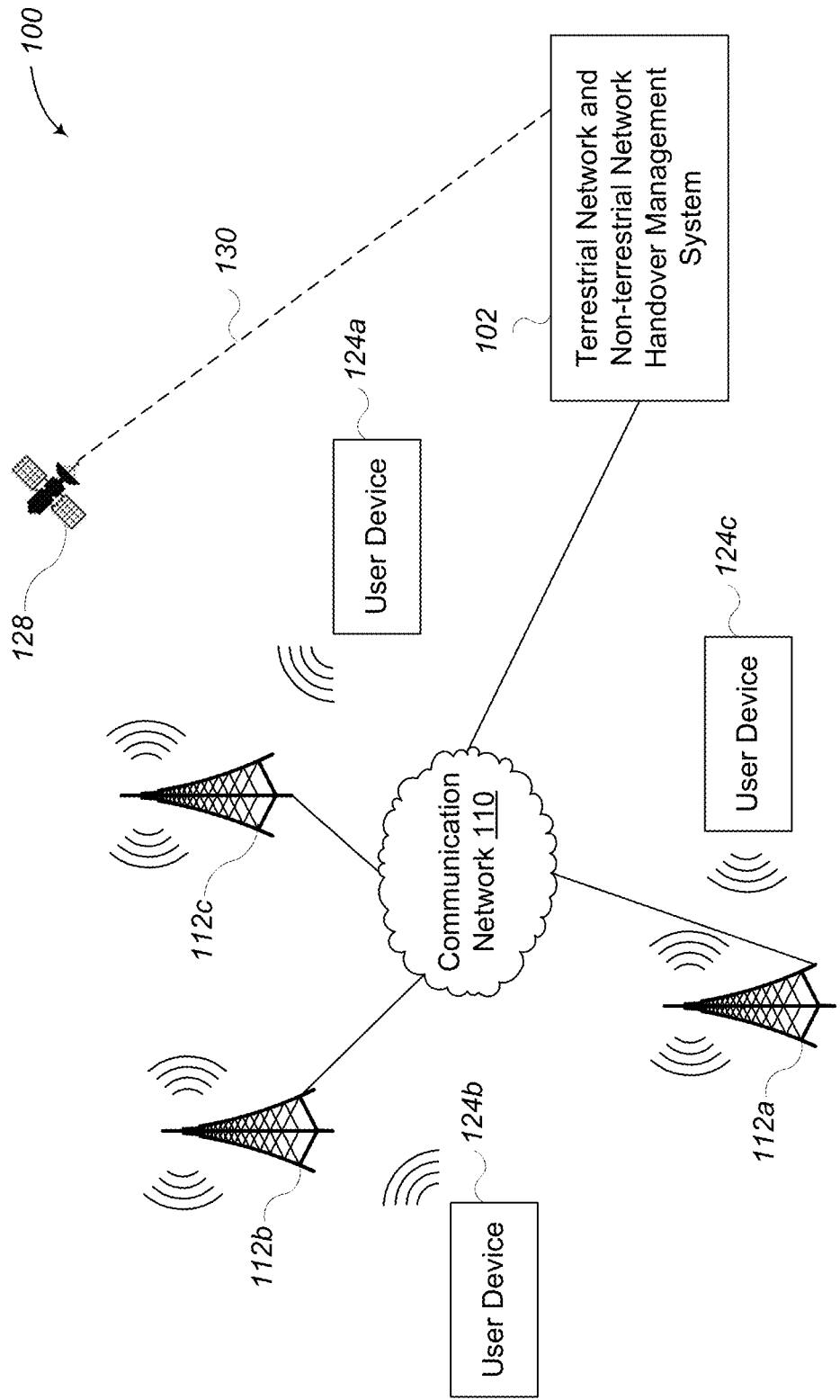
FIG. 1 illustrates a context diagram of an environment for utilizing dynamic terrestrial and non-terrestrial intra gNodeB handover in a wireless network in accordance with embodiments described herein.

FIG. 1 illustrates a context diagram of an environment for utilizing dynamic terrestrial and non-terrestrial intra gNodeB handover in a wireless network in accordance with embodiments described herein. Environment 100 includes a plurality of terrestrial cells 112a-112c, a non-terrestrial cell 128, a plurality of user devices 124a-124b, a terrestrial network and non-terrestrial network handover management system 102, and a communication network 110.

Communication network 110 includes one or more wired or wireless networks, which may include a series of smaller or private connected networks that carry information between the cells 112a-112c, and between the cells 112a-112c and the terrestrial network and non-terrestrial network handover management system 102, and between the cells 112a-112c and other computing devices (not shown).

In various embodiments, environment 100 may be an open radio access network (O-RAN). Such an O-RAN wireless network may include a variety of network components, which are not illustrated for ease of discussion. For example, the O-RAN wireless network can include a core network, a radio access network (RAN) intelligent controller (RIC), an element management system (EMS), one or more central units (CUs), one or more distributed units (DUs), a plurality of radio units (RUs), and a plurality of radio frequency (RF) units (e.g., cells 112 or non-terrestrial cell 128). The CUS, DUs, RUs, and RF units collectively make up one or more next generation NodeB (gNB or gNodeB).

The user devices 124a-124c (collectively or individually referred to as user devices 124 or user device 124) are computing devices that receive and transmit cellular communication messages with terrestrial cells 112a-112c or non-terrestrial cell 128. Examples of user devices 124a-124c may include, but are not limited to, mobile devices, smartphones, tablets, cellular-enabled laptop computers, or other computing devices that can communication with a cellular network. In some embodiments, the user devices 124a-124c may also be referred to as user equipment or UEs.

The terrestrial cells 112a-112c (collectively or individually referred to as cells 112 or cell 112, or terrestrial cells 112 or terrestrial cell 112) are cellular network towers that together provide the hardware infrastructure of a cellular communications network, e.g., a 5G cellular communications network. Cells 112a-112c include or may also be referred to as towers or cell towers. The cell 112a-112c may include or be in communication with base stations, radio back-haul equipment, antennas, or other devices, which are not illustrated for ease of discussion. Each cell 112 provides compatible cellular communications over a coverage area. The coverage area, bandwidth, and overall communication quality depends on multiple factors regarding the cell, including, but not limited to, height of the antenna of the cell above the ground, radio parameters, weather conditions, etc. Although FIG. 1 shows three terrestrial cells 112a-112c, embodiments are not so limited and other numbers of terrestrial cells may be utilized.

User devices 124a-124c communicate with a specifically selected or assigned terrestrial cell 112 or the non-terrestrial cell 128 to transmit data to or to facilitate communication with other user devices 124a-124c or other computing devices (not illustrated). A terrestrial cell 112 or the non-terrestrial cell 128 is selected for a particular user device 124 based on one or more different networking criteria, such as current load on the cells 112a-112c, proximity between the user device 124 and a cell 112, current interference, type of data being transmitted by the user device 124, etc. In various situations and scenarios, a cell 112 may not be communicating with any user devices 124 or a cell 112 may be communicating with a plurality of user devices 124. Although FIG. 1 shows three user devices 124a-124c, embodiments are not so limited and other numbers of user devices may be utilized.

The terrestrial network and non-terrestrial network handover management system 102 is configured to manage handovers between terrestrial cells 112 or the non-terrestrial cell 128 in which a user device 124 is to communicate, as described herein. Briefly, the system 102 determines a location of the user device 124 and determines whether the user device 124 is in a terrestrial-only coverage area, a non-terrestrial-only coverage area, or a boundary area. Depending on where the user device 124 is located, the system 102 selects a terrestrial cell 112 or the non-terrestrial cell 128 to manage communications for the user device 124. As described herein, the terrestrial cells 112 in the boundary area are clustered based on their proximity to one another. The system 102 performs handovers from one cell to another, or to or from the non-terrestrial cell, using intra gNodeB handover based on these clusters, as described herein.

Figure 2:
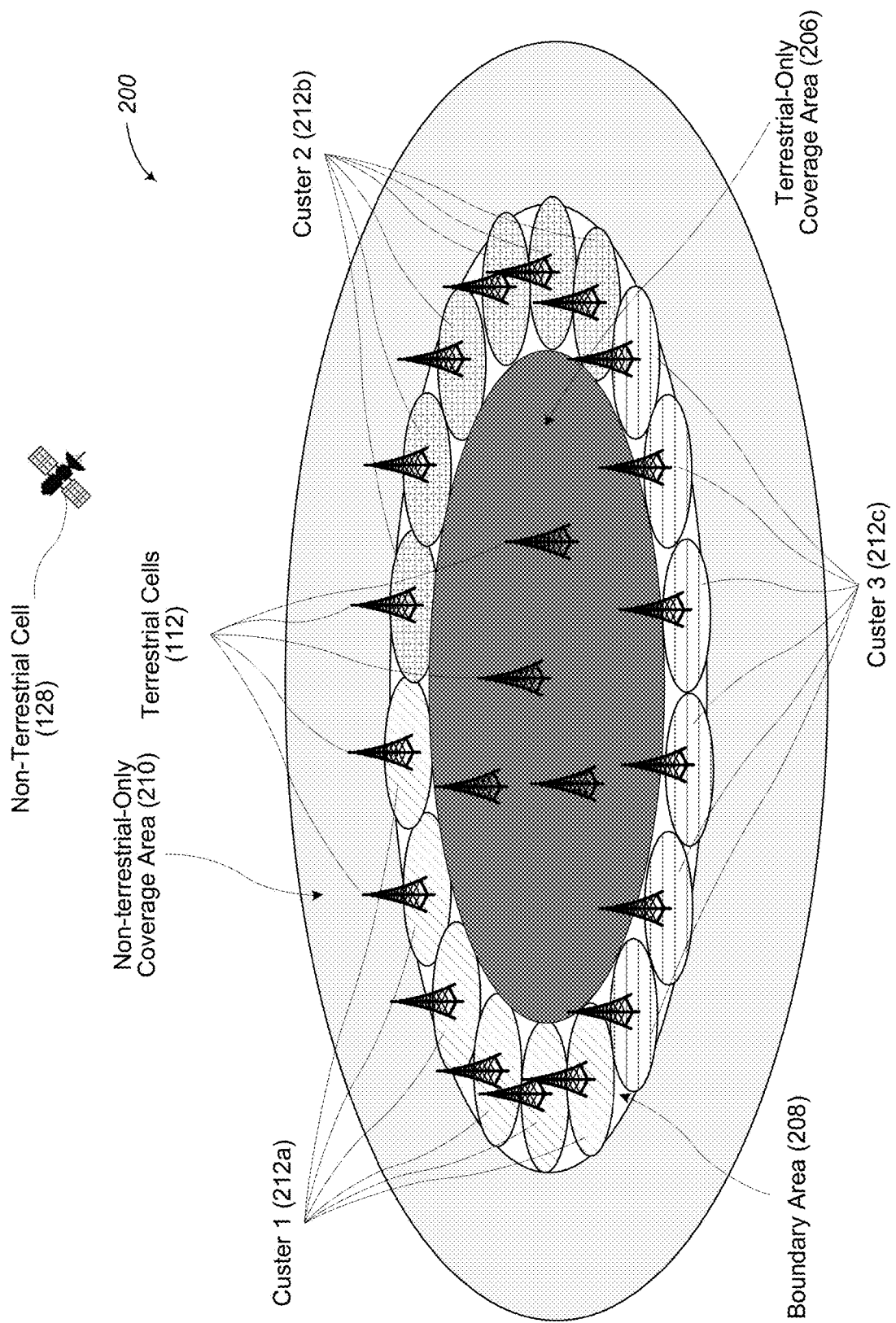
FIG. 2 is a context diagram of a non-limiting embodiment of use case network coverage area utilizing dynamic terrestrial and non-terrestrial intra gNodeB handover in accordance with embodiments described herein.

FIG. 2 is a context diagram of a non-limiting embodiment of use case network coverage area 200 utilizing dynamic terrestrial and non-terrestrial intra gNodeB handover in accordance with embodiments described herein. Network coverage area 200 includes a non-terrestrial-only coverage area 210, a terrestrial-only coverage area 206, and a boundary area 208.

The non-terrestrial-only coverage area 210 is an area in which a user device can communicate with the non-terrestrial cell 128, but not with (or cannot maintain a select quality of service with) terrestrial cells 112. User devices that can communicate with the non-terrestrial cell 128 but not terrestrial cells 112 may be referred to as user devices located within the non-terrestrial-only coverage area 210.

The boundary area 208 is an area in which a user device can communicate with terrestrial cells 112 that are adjacent to the non-terrestrial-only coverage area 210. User devices that can communicate with the terrestrial cells 112 that are adjacent to the non-terrestrial-only coverage area 210 may be referred to as user devices located within the boundary area 208.

The terrestrial-only coverage area 206 is an area in which user devices can communicate with terrestrial cells 112 that are not adjacent to the non-terrestrial-only coverage area 210. In other words, there are other terrestrial cells 112 in the boundary area 208 that have a coverage area between the terrestrial-only coverage area 206 and the non-terrestrial-only coverage area 210. Although the terrestrial-only coverage area 206 is referred to as terrestrial only, the non-terrestrial cell 128 may have coverage over that same area due to its positioning and technology, but a user device in the terrestrial-only coverage area 206 will be assigned to and communicate with a terrestrial cell 112 only and not the non-terrestrial cell 128.

Although the non-terrestrial-only coverage area 210, the terrestrial-only coverage area 206, the boundary area 208, and the coverage area of each terrestrial cell 112 are illustrated as being oval or circular, embodiments are not so limited. Rather, the size, shape, and coverage of the non-terrestrial-only coverage area 210, the terrestrial-only coverage area 206, the boundary area 208, and the coverage areas of the terrestrial cells are determined by the coverage area of the terrestrial cells 112 and the non-terrestrial cell 128, which may be impacted by the geography, hardware configuration or limitations of the cells, directional antennas, height of the cells, administrator-defined coverage areas, etc.

The terrestrial cells 112 located within the boundary area 208 are logically separated into multiple clusters 212a-212c. Each cluster 212a-212c includes a plurality of terrestrial cells 112 that a geographically near or proximate to one another and are adjacent to the non-terrestrial-only coverage area 210. In various embodiments, an administrator may define which terrestrial cells 112 are within the boundary area 208 and are included in each cluster. In other embodiments, those terrestrial cells 112 that match one or more geographic clustering criteria may be included in a same cluster. In this illustrated example, there are three clusters 212a, 212b, and 212c. Terrestrial cells 112 that are geographically proximate can be clustered because there is a higher likelihood of a user device being handed over between those cells and the non-terrestrial cell as the user device moves in or near the border between the boundary area 208 and the non-terrestrial-only coverage area 210.

Figure 3:
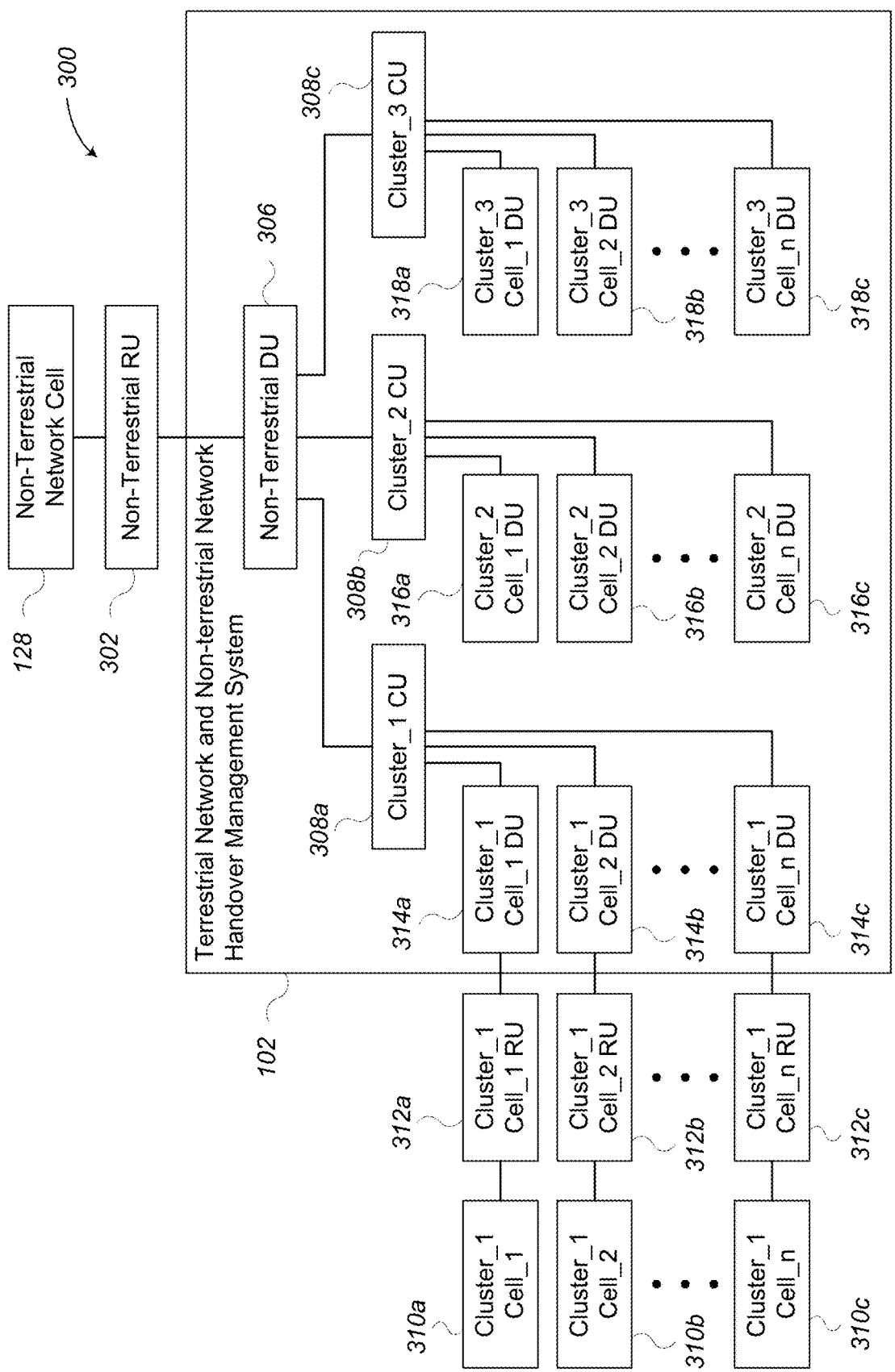
FIG. 3 is a context diagram illustrating a use case system utilizing dynamic terrestrial and non-terrestrial intra gNodeB handover in accordance with embodiments described herein.

FIG. 3 is a context diagram illustrating a use case system 300 utilizing dynamic terrestrial and non-terrestrial intra gNodeB handover in accordance with embodiments described herein. System 300 includes a terrestrial network and non-terrestrial network handover management system 102, a non-terrestrial network cell 128, and terrestrial cells 310a-310c. The terrestrial cells 310a-310c are embodiments of cells 112 in the boundary area 208 in FIG. 2. Similar to FIG. 2, assume a plurality of terrestrial cells in a boundary area are grouped into three clusters, although more or fewer clusters may also be used. System 300 groups terrestrial cells 310a-310c into cluster_1, groups one or more terrestrial cells in cluster_2 (not illustrated), and groups one or more terrestrial cells in cluster_3 (not illustrated). The terrestrial cells grouped into cluster_2 and cluster_3 are not shown for case of illustration.

Non-terrestrial cell 128 is in communication with a non-terrestrial radio unit (RU) 302. And cells 310a-310c are in communication with cell RUs 312a-312c, respectively. The RUS 312a-312c may include hardware or software to manage communications sent to and received from terrestrial cells 310a-310c, such as to process analog and digital signals used in the communication between the network and user devices via the terrestrial cells 312a-312c. Similarly, RU 302 may include hardware or software to manage communications sent to and received from non-terrestrial cell 128, such as to process analog and digital signals used in the communication between the network and user devices via the non-terrestrial cell 128. Although non-terrestrial RU 302 is illustrated as be separate from non-terrestrial cell 128 and system 102, and RUs 312a-312c are illustrated as be separate from terrestrial cells 310a-310c and system 102, embodiments are not so limited.

System 102 manages distributed units (DUs) and central units (CUs) for system 300, which, as discussed herein, may be an O-RAN wireless network. For example, the system 102 manages a single CU 308a for terrestrial cells 310a-310c in Cluster_1, a single CU 308b for terrestrial cells in Cluster_2 (not illustrated), and a single CU 308c for terrestrial cells in Cluster_3 (not illustrated). Each separate CU 308a-308c is mapped to a particular cluster, and each CU 308a-308c is also mapped to the non-terrestrial cell 128. The CUS 308a-308c are configured to control the operations of the distributed units over the midhaul. The CUs may perform Radio Resource Control (RRC) protocol connection establishment, connection release, broadcast of system information, radio bearer establishment, radio bearer reconfiguration, radio bearer release, connection mobility procedures, paging notification, or other network functions.

As illustrated, CUs 308a-308c serve and may be connected to multiple DUs for multiple terrestrial cells based on their respective cluster. Likewise, CUs 308a-308c serve and may be connected to non-terrestrial DU 306 for the non-terrestrial network cell 128.

The system 102 manages a non-terrestrial DU 306 for the non-terrestrial network cell 128 and DUs 314a-314c for each terrestrial cell in the boundary area. The DUs 314a-314c perform the fronthaul to coordinate signals between the respective RUs 312a-312c for the respective cells 310a-310c in cluster_1 and the CU 308a for cluster_1. The non-terrestrial DU 306 coordinates signals between the non-terrestrial RU 302 for the non-terrestrial cell 128 and the CUs 308a-308c. The non-terrestrial DU 302 or the DUs 314a-314c may also perform other network processing and management, such as resource element mapping, layer mapping scrambling, precoding, modulation, encoding, etc. System 102 also manages DUs 316a-316c for coordinating signals between the respective RU for the respective cells in cluster_2 and the CU 308b for cluster_2. Moreover, system 102 also manages DUs 318a-318c for coordinating signals between the respective RU for the respective cells in cluster_3 and the CU 308c for cluster_3.

The CUs and the DUs may each be virtual servers that are hosted and virtualized using underlying computing resources (such as physical servers, routers and memory for data storage, among others). The underlying computing resources may be located in the same data center or different data centers.

The system 102 may also include other network management components that are not illustrated. For example, CUs 308a-308c may have a backhaul connection to a RAN intelligent controller. The RAN intelligent controller may be configured to control and optimize the functions of the wireless system 300. The RAN intelligent controller may perform load balancing to mitigate network congestion. The RAN intelligent controller may also deploy new services. The RAN intelligent controller may perform data processing and apply artificial intelligence (AI) or machine learning (ML) models to data trafficked over the system 300. The RAN intelligent controller may perform real-time automation and enable proactive network resource management and service differentiation.

As described herein, the system performs handovers between terrestrial cells within the boundary area and the non-terrestrial cell 128 based on their respective CUs. For example, if a user device is connected to cell 310a, then the system 300 utilizes RU 312a, DU 314a, and CU 308a to manage the communications for the user device. If the user device changes location to be in the coverage area of cell 310b, then system 102 hands over the connection from cell 310a to cell 310b utilizing RU 312b, DU 314b, and maintains CU 308a. Accordingly, there is no handover of the CU when handing over a connection from one terrestrial cell in the boundary area to another terrestrial cell in the boundary area for the same cluster.

Likewise, if the user device changes location from the coverage area of terrestrial cell 310a to be in the non-terrestrial-only coverage area of the non-terrestrial cell 128, then system 102 hands over the connection from cell 310a to non-terrestrial cell 128 utilizing non-terrestrial RU 302, non-terrestrial DU 306, and maintains CU 308a. Accordingly, there is no handover of the CU when handing over a connection from one terrestrial cell in the boundary area to the non-terrestrial cell 128.

But, if the user device changes location from the coverage area of terrestrial cell 310a to be in the coverage area of a terrestrial cell in a different cluster, then system 102 hands over the connection from cell 310a to another terrestrial cell utilizing its RU, DU 306, and cluster CU (e.g., CU 308b). Accordingly, there is a handover of the CU when handing over a connection from one terrestrial cell in the boundary area to another terrestrial cell in the boundary area for a separate cluster.

If the user device is connecting to the non-terrestrial cell 128, then the cluster associated with a nearest terrestrial cell is identified. For example, if cell 310c is closest to the user device, then the user device is connected to the non-terrestrial cell 128 utilizing non-terrestrial RU 302, non-terrestrial DU 306, and CU 308a (the CU for cluster_1 in which cell 310c is included). If the user device changes location from the non-terrestrial-only coverage area to a coverage area of terrestrial cell 310a, then system 102 hands over the connection from the non-terrestrial cell 128 to terrestrial cell 310a utilizing its RU 312a, DU 3314a, and maintaining CU 308a. Accordingly, there is no handover of the CU when handing over a connection from the non-terrestrial cell 128 to a terrestrial cell in the boundary area in the same cluster as the current CU.

As mentioned above, system 102 manages CUs at the cluster-level for terrestrial cells in the boundary area and the non-terrestrial cell, as well as individual DUs for terrestrial cells in the boundary area and the non-terrestrial cell. Although not illustrated in FIG. 3, the system 102 may also manage individual CUs and DUs for terrestrial cells in a terrestrial-only coverage area (e.g., terrestrial-only coverage area 206). Accordingly, if the user device changes location from the coverage area of terrestrial cell 310a to be in the coverage area of a terrestrial cell in the terrestrial-only coverage area, then system 102 hands over the connection from cell 310a to another terrestrial cell in the terrestrial-only coverage area utilizing its respective RU, DU, and CU (not CUs 308a-308c).

The operation of certain aspects will now be described with respect to FIGS. 4 and 5A-5C. Process 400 and 500 described in conjunction with FIGS. 4 and 5A-5C may be implemented by one or more processors or executed via circuitry on one or more computing devices, such as terrestrial network and non-terrestrial network handover management system 102 in FIG. 1.

Figure 4:
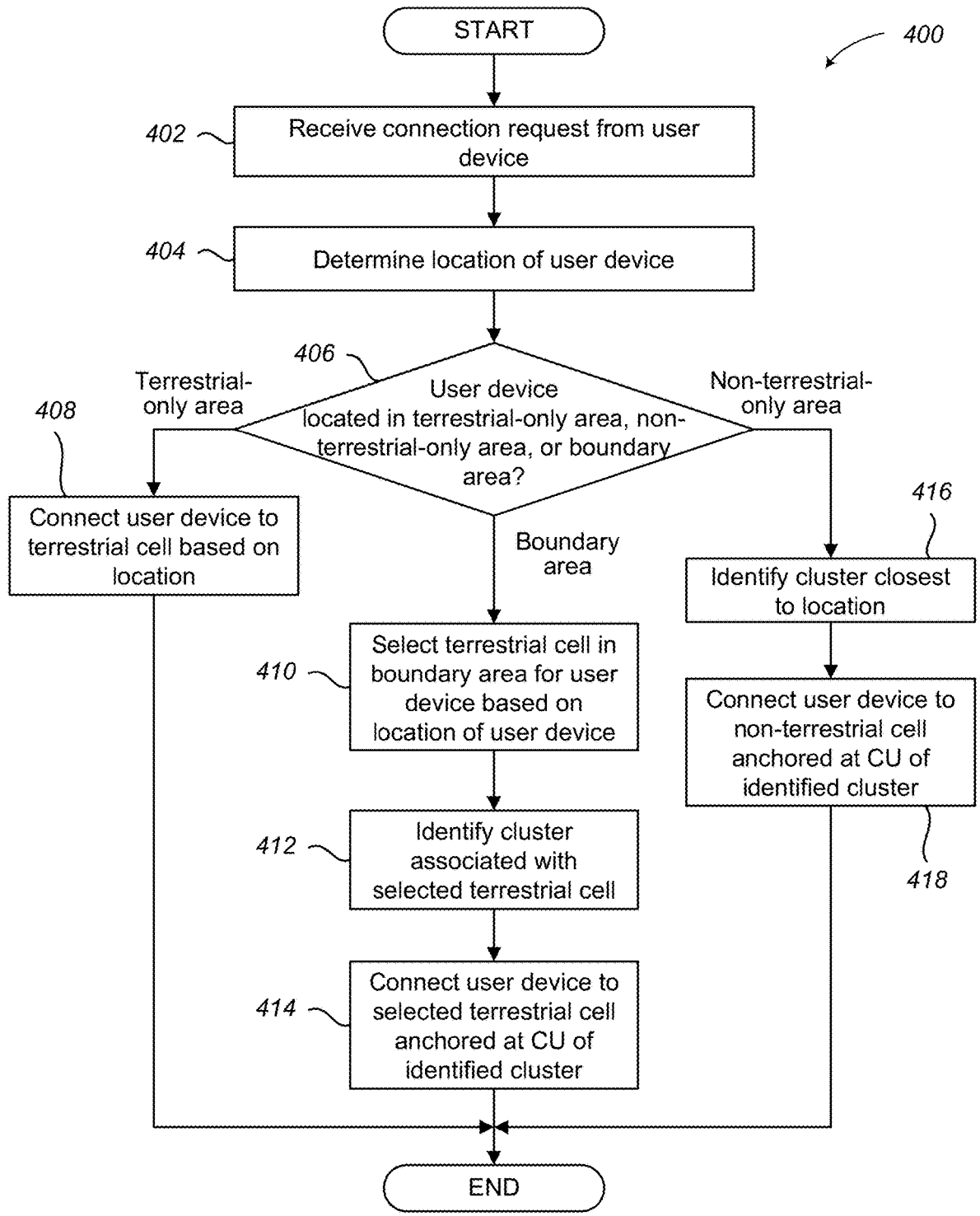
FIG. 4 illustrates a logical flow diagram showing one embodiment of a process for connecting a user device in a network utilizing dynamic terrestrial and non-terrestrial intra gNodeB handover in accordance with embodiments described herein.

FIG. 4 illustrates a logical flow diagram showing one embodiment of a process 400 for connecting a user device in a network utilizing dynamic terrestrial and non-terrestrial intra gNodeB handover in accordance with embodiments described herein.

Process 400 begins, after a start block, at block 402, where a connection request is received from a user device. The connection request is a request for the user device to connect to a wireless network. The connection request may be initially received from the user device by a terrestrial cell or a non-terrestrial in which the user device can communicate. The receiving cell may then communicate the connection request to the computing device or system performing process 400.

Process 400 proceeds after block 402 to block 404, where a location of the user device is determined. In some embodiments, the connection request may include a GPS location of the user device. In other embodiments, the user device may be queried for its location as part of a connection handshake between the user device and the terrestrial cell or a non-terrestrial in which the user device can communicate. In yet other embodiments, an orientation of directional antennas and receipt power of transmissions from the user device may be used to estimate the location of the user device.

Process 400 continues after block 404 at decision block 406, where a determination is made whether the user device is located in a terrestrial-only coverage area (e.g., terrestrial-only coverage area 206 in FIG. 2), a non-terrestrial-only coverage area (e.g., non-terrestrial-only coverage area 210 in FIG. 2), or a boundary area where the terrestrial coverage area and the non-terrestrial coverage area overlap (e.g., boundary area 208 in FIG. 2). In various embodiments, the location of the user device is compared to known terrestrial-only coverage areas, known non-terrestrial-only coverage areas, and known boundary areas to determine from which area the user device is attempting to connect to the network. If the user device is located in a terrestrial-only coverage area, then process 400 flows from decision block 406 to block 408; if the user device is located in a non-terrestrial-only coverage area, then process 400 flows from decision block 406 to block 412; and if the user device is located in a boundary area, then process 400 flows from decision block 406 to block 410.

If the user device is located in a terrestrial-only coverage area, then, at block 408, the user device is connected to a terrestrial cell in the terrestrial-only area based on the location of the user device. In at least one embodiment, the user device is connected to the terrestrial cell in the terrestrial-only coverage area closest to the user device. In other embodiments, the user devices is connected to a terrestrial cell in the terrestrial-only coverage area not closest to the user device, but is within communication range of the user device and has computing resources to manage the communications with the user device. For example, the user device may be connected to a terrestrial cell in the terrestrial-only coverage area based on the quality of service between the user device and the terrestrial cell, a load on the terrestrial cell or neighboring cells, or other criteria.

In various embodiments, the user device is connected to the terrestrial cell in the terrestrial-only coverage area by anchoring the communications for the user device at the CU and DU of that particular terrestrial cell. After block 408, process 400 terminates or otherwise returns to a calling process to perform other actions.

If the user device is located in a boundary area, then process 400 flows from decision block 406 to block 410. At block 410, a terrestrial cell in the boundary area is selected for the user device based on the user's location. In at least one embodiment, the terrestrial cell in the boundary area closest to the user device may be selected. In other embodiments, the terrestrial cell in the boundary area not closest to the user device, but is within communication range of the user device and has computing resources to manage the communications with the user device is selected. For example, the terrestrial cell may be selected based on the quality of service between the user device and the terrestrial cell, a load on the terrestrial cell or neighboring cells, or other criteria.

Process 400 proceeds after block 410 to block 412, where a cluster associated with the selected terrestrial cell is identified. As discussed herein, the terrestrial cells in the boundary area are logically separated into different clusters based on their location and coverage areas relative to one another.

Process 400 continues after block 412 at block 414, where the user device is connected to the selected terrestrial cell anchored at the CU of the cluster identified in block 412 and at the DU of the selected terrestrial cell. As discussed herein, each separate cluster of cells is associated with a separate CU. In this way, each cell associated with a particular cluster is anchored to the same CU, while being associated with its own DU. After block 414, process 400 terminates or otherwise returns to a calling process to perform other actions.

If the user device is located in a non-terrestrial-only coverage area, then process 400 flows from decision block 406 to block 416. At block 416, a cluster of terrestrial cells in the boundary area closest to the location of the user device is identified.

Process 400 proceeds after block 416 to block 418, where the user device is connected to the non-terrestrial cell anchored at the CU of the cluster identified in block 416 and at the DU of the non-terrestrial cell. After block 418, process 400 terminates or otherwise returns to a calling process to perform other actions.

Figure 5A:
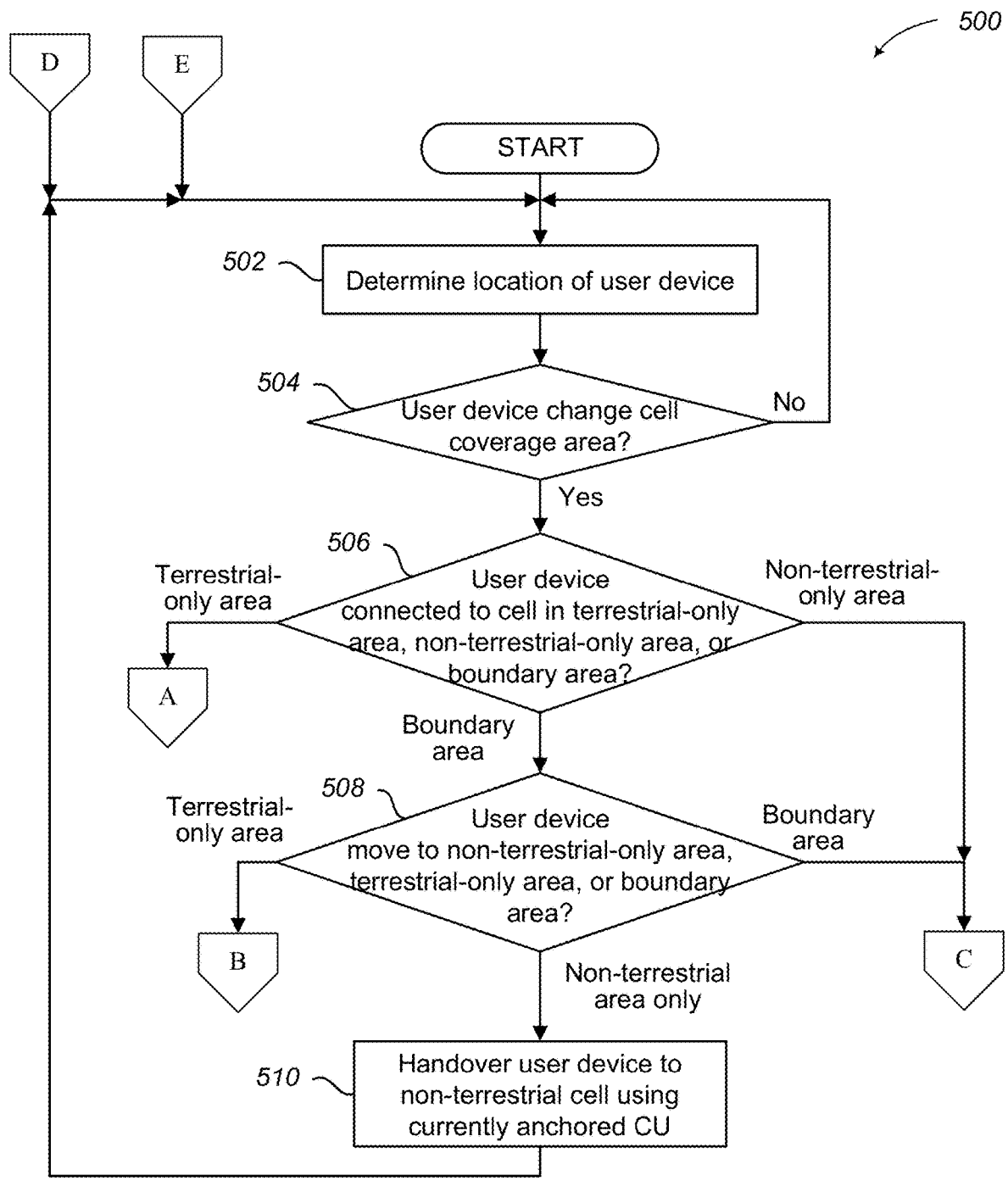
FIGS. 5A-5C illustrate a logical flow diagram showing one embodiment of a process for performing handovers in a dynamic terrestrial and non-terrestrial intra gNodeB handover network in accordance with embodiments described herein.
Figure 5B:
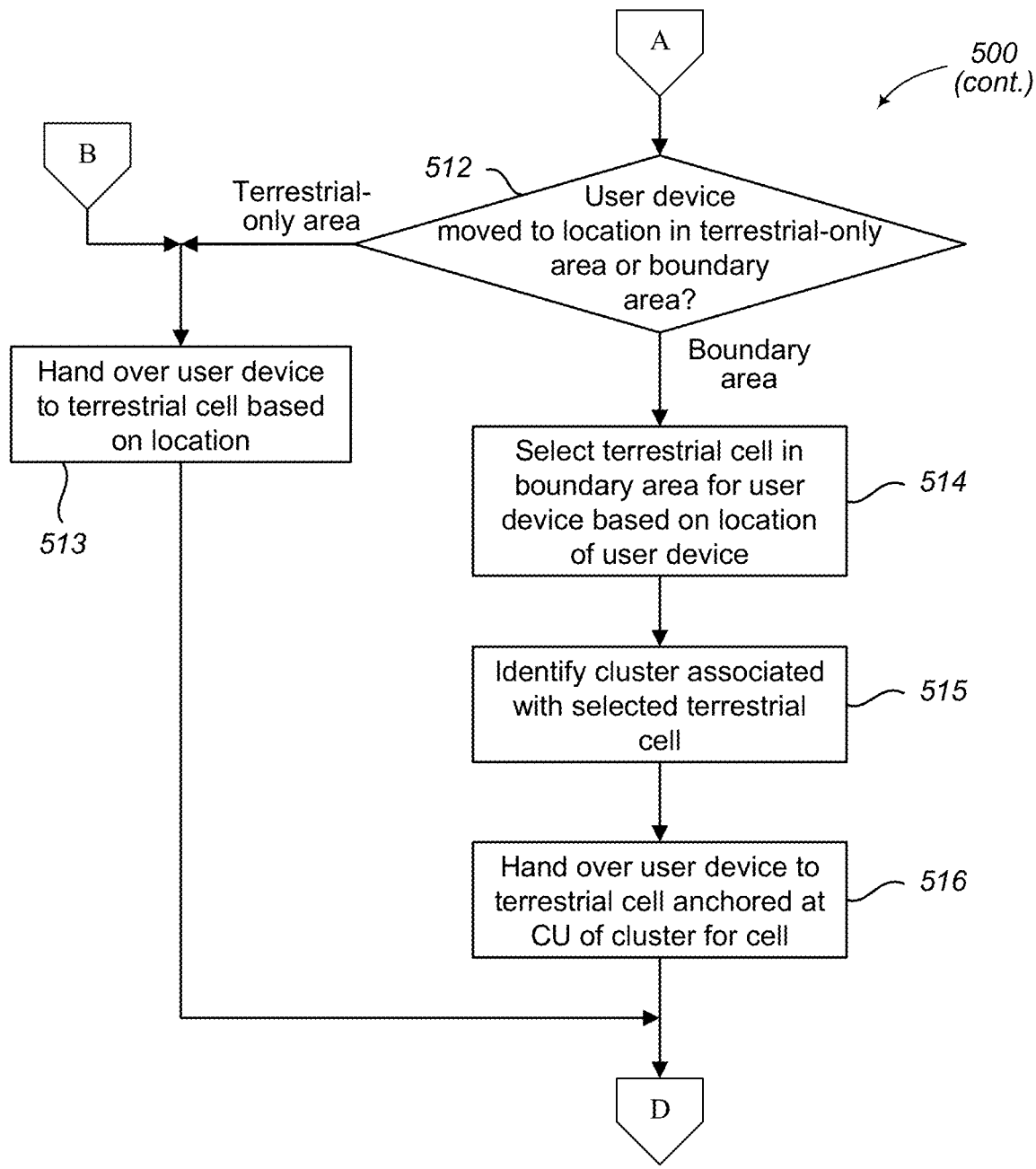
Figure 5C:
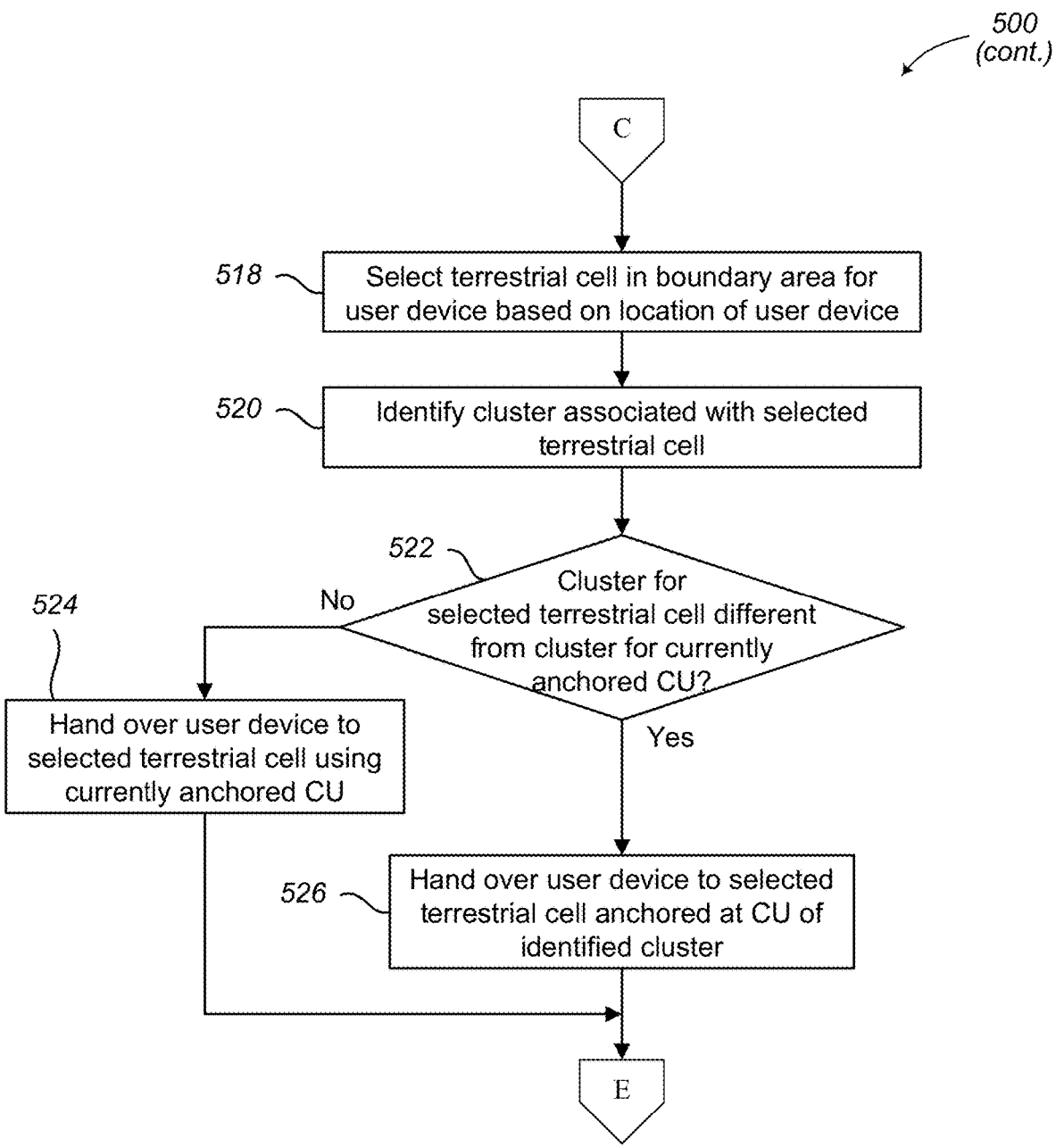

In various embodiments, after the user device is connected to a terrestrial cell or a non-terrestrial cell, process 500 in FIGS. 5A-5C may be implemented to track whether the user device has moved locations and has triggered a handover condition.

FIGS. 5A-5C illustrate a logical flow diagram showing one embodiment of a process 500 for performing handovers in a dynamic terrestrial and non-terrestrial intra gNodeB handover network in accordance with embodiments described herein.

Process 500 begins, after a start block, at block 502, where a location of the user device is determined. Because user devices can move, the location of the user device is tracked over time. In various embodiments, block 502 may employ embodiments of block 404 in FIG. 4 to determine or obtain an updated location of the user device.

Process 500 proceeds after block 502 to decision block 504, where a determination is made whether the user device has changed cell coverage areas. In at least one embodiment, this determination is based on whether the user device has or is approaching an outer limit of the coverage area of the current cell with which it is communicating. In other embodiments, this determination is based on whether the user device has entered the coverage area of another cell. If the user device has changed cell coverage areas, then process 500 flows to decision block 506; otherwise, process 500 loops to block 502 to continue to monitor the location of the user device to determine if it changes cell coverage areas.

At decision block 506, a determination is made whether the user device is currently connected to a terrestrial cell in the terrestrial-only coverage area, currently connected to a non-terrestrial cell in the non-terrestrial-only coverage area, or currently connected to a terrestrial cell in the boundary area. If the user device is currently connected to a terrestrial cell in the terrestrial-only coverage area, then process 500 flows from decision block 506 in FIG. 5A to decision block 512 in FIG. 5B; if the user device is currently connected to a non-terrestrial cell in the non-terrestrial-only coverage area, then process 500 flows from decision block 506 in FIG. 5A to block 518 in FIG. 5C; and if the user device is currently connected to a terrestrial cell in the boundary area, then process 500 flows from decision block 506 in FIG. 5A to decision block 508 in FIG. 5A.

At decision block 508, a determination is made whether the user device has moved from the boundary area into the non-terrestrial-only coverage area, moved from the boundary area into the terrestrial-only coverage area, or stayed in the boundary area. In various embodiments, this determination is made based on a comparison between the updated location determined for the user and known cell coverage areas, similar to decision block 406 in FIG. 4. If the user device is has moved to the terrestrial-only coverage area, then process 500 flows from decision block 505 in FIG. 5A to block 514 in FIG. 5B; if the user device has moved to the non-terrestrial-only coverage area, then process 500 flows from decision block 508 in FIG. 5A to block 510 in FIG. 5A; and if the user device has changed cell coverage areas, but remains in the boundary area, then process 500 flows from decision block 508 in FIG. 5A to block 518 in FIG. 5C.

If the user device has moved from the boundary area to the non-terrestrial-only coverage area, then process 500 flows from decision block 508 to block 510. At block 510, a handover procedure is performed to handover the user device to the non-terrestrial cell using the currently anchored CU. As described herein, the CUs of the clusters of terrestrial cells in the boundary area are also mapped to the non-terrestrial cell. Therefore, the user device can be handed over from the current terrestrial cell in the boundary area to the non-terrestrial cell, while still being anchored at the same CU. In this way, if the user device is bouncing between the boundary area and the non-terrestrial-only coverage area, handovers can be quick and efficient by maintaining the same CU for the communications with the user device.

After block 510, process 500 loops to block 502 to continue to monitor the location of the user device to determine if it has moved from the non-terrestrial-only overage area into the boundary area or the terrestrial-only coverage area.

If the user device has changed cell coverage areas and is currently connected to a cell in the non-terrestrial-only coverage area, as determined at decision block 506, or if the user device has changed cell coverage areas while remaining in the boundary area, then process 500 flows from decision block 506 or decision block 508 to block 518 in FIG. 5C.

At block 518 in FIG. 5C, a terrestrial cell in the boundary area is selected for the user device based on the current or updated location of the user device. In various embodiments, block 518 may employ embodiments of block 410 in FIG. 4 to select a terrestrial cell in the boundary area based on the location of the user device.

Process 500 proceeds after block 518 to block 520, where a cluster associated with the selected terrestrial cell is identified. In various embodiments, block 520 may employ embodiments of block 412 in FIG. 4 to identify the cluster associated with the selected terrestrial cell.

Process 500 continues after block 520 at decision block 522, where a determination is made whether the cluster for the selected terrestrial cell is different from the cluster of the currently anchored CU for the user device. If the cluster for the selected terrestrial cell is different from the cluster of the currently anchored CU for the user device, then process 500 flows from decision block 522 to block 526; otherwise, process 500 flows from decision block 522 to block 524.

At block 526, the user device is handed over to the selected terrestrial cell anchored at the CU of the identified cluster. After block 526, process 500 loops to block 502 in FIG. 5A to continue to monitor the location of the user device to determine if it changes cell coverage areas.

If the cluster for the selected terrestrial cell is the same as the cluster for the currently anchored CU—i.e., if the selected terrestrial cell is in the same cluster as the currently connected terrestrial cell, then process 500 flows from decision block 522 in FIG. 5C to block 524 in FIG. 5C. At block 524, the user device is handed over to the selected terrestrial cell using the currently anchored CU. In this way, handover from one terrestrial cell to another terrestrial cell in the same cluster in the boundary area occurs without changing the CU. After block 524, process 500 loops to block 502 in FIG. 5A to continue to monitor the location of the user device to determine if it changes cell coverage areas.

If the user device has changed cell coverage areas and is currently connected to a terrestrial cell in the terrestrial-only coverage area, as determined at decision block 506, then process 500 flows from decision block 506 in FIG. 5A to decision block 512 in FIG. 5B. At decision block 512, a determination is made whether the user device has moved to another location in the terrestrial-only coverage area or has moved to a location in the boundary area. If the user device has moved to a location in the boundary area, then process 500 flows to block 514; otherwise, if the user device has moved to another location within the terrestrial-only coverage area, then process 500 flows to block 513.

At block 514, a terrestrial cell in the boundary area is selected for the user device based on the user's location. In various embodiments, block 514 may employ embodiments of block 410 in FIG. 4 to selected the terrestrial cell in the boundary area.

Process 500 proceeds after block 514 to block 515, where a cluster associated with the selected terrestrial cell is identified. In various embodiments, block 515 may employ embodiments of block 412 in FIG. 4 to identify the cluster of the selected terrestrial cell.

Process 500 continues after block 515 at block 516, where the user device is handed over to the selected terrestrial cell anchored at the CU of the cluster identified in block 515.

After block 516, process 500 loops to block 502 to continue to monitor the location of the user device to determine if it changes cell coverage areas.

If the user device has changed cell coverage areas, but remained in the terrestrial-only area, as determined at decision block 512, or if the user device has changes cell coverage areas but moved from the boundary area to the terrestrial-only coverage area, as determined at decision block 508 in FIG. 5A, then process 500 proceeds to block 513 in FIG. 5B. At block 513, the user device is handed over to a terrestrial cell in the terrestrial-only coverage area based on the location of the user device. In various embodiments, block 513 may employ embodiments of block 408 to handover and connect the user device to a terrestrial cell in the terrestrial-only coverage area.

After block 513, process 500 loops to block 502 to continue to monitor the location of the user device to determine if it changes cell coverage areas.

Process 500 may continue to monitor the location of the user device and handover the cell to other terrestrial cells or to a non-terrestrial cell based on its movement between the terrestrial-only coverage area, boundary area, and non-terrestrial-only coverage area.

Figure 6:
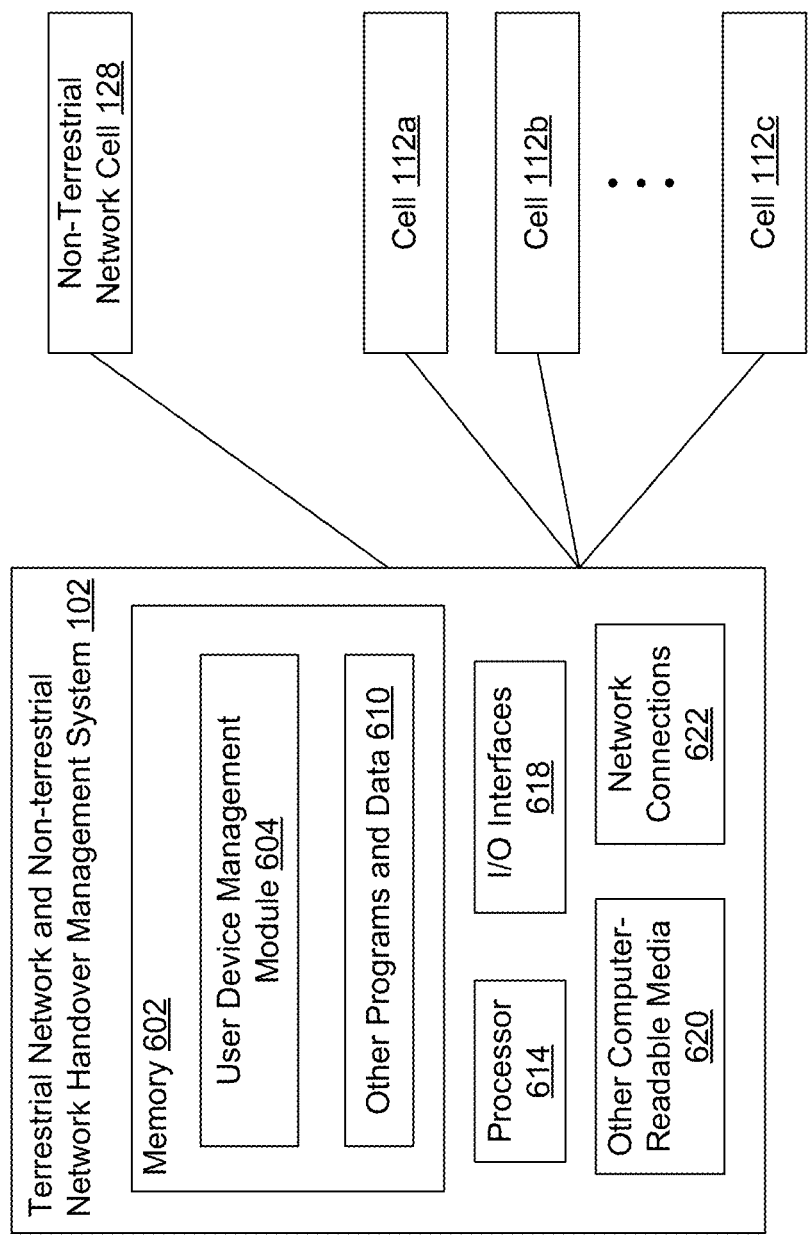
FIG. 6 shows a system diagram that describes various implementations of computing systems for implementing embodiments described herein.

FIG. 6 shows a system diagram that describes various implementations of computing systems for implementing embodiments described herein. System 600 includes a terrestrial network and non-terrestrial network handover management system 102 and cells 112a-112c, and non-terrestrial cell 128, similar to FIG. 1.

The terrestrial network and non-terrestrial network handover management system 102 monitors changes in the location of a user device to determine when handovers occur and how to process those handovers based on the user device's movement between the terrestrial-only coverage area, boundary area, and non-terrestrial-only coverage area, as described herein. One or more special-purpose computing systems may be used to implement the terrestrial network and non-terrestrial network handover management system 102. Accordingly, various embodiments described herein may be implemented in software, hardware, firmware, or in some combination thereof. The terrestrial network and non-terrestrial network handover management system 102 may include memory 602, one or more processors 614 (e.g., central processing unit, microcontroller, virtual processing resources, etc.), I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by processor 614 to perform actions, including embodiments described herein.

Memory 602 may have stored thereon user device management module 604. The user device management module 604 is configured to identify the location and movement of a user device and to perform handovers, as described herein. Although the user device management module 604 is illustrated as a single module, embodiments are not so limited. Rather, one module or a plurality of modules may be employed to perform the functionality of the user device management module 604. Moreover, the functionality of the user device management module 604 may be performed using circuitry or other computer hardware components or software.

Memory 602 may also store other programs and data 610, such as known coverage areas for terrestrial cells 112a-112c and non-terrestrial cell 128.

Network connections 622 are configured to communicate with other computing devices, such as cells 112a-112c and non-terrestrial cell 128, or other intermediate computing devices between the terrestrial network and non-terrestrial network handover management system 102 and the cells 112a-112c or the non-terrestrial cell 128. In various embodiments, the network connections 622 include transmitters and receivers (not illustrated) to send and receive data as described herein. I/O interfaces 618 may include video interfaces, audio interfaces, other data input or output interfaces, or the like. Other computer-readable media 620 may include other types of stationary or removable computer-readable media, such as removable flash drives, external hard drives, or the like.

The following is a summarization of the claims as filed.

A method may be summarized as comprising receiving a connection request from a user device to connect to a wireless network and determining a location of the user device. In response to determining that the user device is located within a terrestrial-only coverage area of the wireless network, connecting the user device to a first terrestrial cell within the terrestrial-only coverage area. In response to determining that the user device is located within a boundary area associated with the terrestrial-only coverage area and a non-terrestrial-only coverage area of a non-terrestrial cell of the wireless network: selecting a second terrestrial cell in the boundary area for the connection request of the user device; identifying a first cluster of terrestrial cells associated with the second terrestrial cell; and connecting the user device to the second terrestrial cell based on the first cluster. And in response to determining that the user device is located within the non-terrestrial-only coverage area of the wireless network: identifying a second cluster of terrestrial cells associated with a third terrestrial cell within the boundary area closest to the user device; and connecting the user device to the non-terrestrial cell based on the second cluster.

Connecting the user device to the second terrestrial cell based on the first cluster may further comprise: anchoring the connection between the user device and the wireless network with a central unit associated with the first cluster and a distributed unit for the first terrestrial cell.

In some embodiments, after connecting the user device to the second terrestrial cell, the method may include: determining that the user device has moved into the non-terrestrial-only coverage area of the wireless network; and handing over the connection from the second terrestrial cell to the non-terrestrial cell anchored with the central unit associated with the first cluster and a second distributed unit for the non-terrestrial cell.

In other embodiments, after connecting the user device to the second terrestrial cell, the method may include: determining that the user device has moved into a coverage area of a fourth terrestrial cell within the boundary area; determining that the fourth terrestrial cell is associated with the first cluster; and handing over the connection from the second terrestrial cell to the fourth terrestrial cell anchored with the central unit associated with the first cluster and a second distributed unit for the fourth terrestrial cell.

Connecting the user device to the non-terrestrial cell based on the second cluster may further comprise: anchoring the connection between the user device and the wireless network with a central unit associated with the second cluster and a distributed unit for the non-terrestrial cell.

After connecting the user device to the non-terrestrial cell, the method may include: determining that the user device has moved into the boundary area of the wireless network; determining that the user device has moved into a coverage area of a fourth terrestrial cell within the boundary area; determining that the fourth terrestrial cell is associated with the second cluster; and handing over the connection from the non-terrestrial cell to the fourth terrestrial cell anchored with the central unit associated with the second cluster and a second distributed unit for the fourth terrestrial cell.

Connecting the user device to the first terrestrial cell may further comprise: anchoring the connection between the user device and the wireless network with a central unit specific for the first terrestrial cell and a distributed unit specific for the first terrestrial cell.

A system may be summarized as comprising: a memory configured to store computer instructions; and a processor configured to execute the computer instruction to: receive a connection request from a user device to connect to a wireless network; and determine a location of the user device. In response to the user device being located within a terrestrial-only coverage area of the wireless network, connect the user device to a first terrestrial cell within the terrestrial-only coverage area. In response to the user device being located within a boundary area between the terrestrial-only coverage area and a non-terrestrial-only coverage area of a non-terrestrial cell of the wireless network: select a second terrestrial cell in the boundary area for the connection request of the user device; identify a first cluster of terrestrial cells associated with the second terrestrial cell; and connect the user device to the second terrestrial cell anchored with a first central unit dedicated for the first cluster. And in response to the user device being located within the non-terrestrial-only coverage area of the wireless network: identify a second cluster of terrestrial cells associated with a third terrestrial cell within the boundary area closest to the user device; and connect the user device to the non-terrestrial cell anchored with a second central unit dedicated for the second cluster.

In some embodiments, after the user device is connected to the second terrestrial cell, the processor may be configured to further execute the computer instructions to: determine that the user device has moved into the non-terrestrial-only coverage area of the wireless network; and handover the connection from the second terrestrial cell to the non-terrestrial cell anchored with the first central unit dedicated for the first cluster.

In other embodiments, after the user device is connected to the second terrestrial cell, the processor may be configured to further execute the computer instructions to: determine that the user device has moved into a coverage area of a fourth terrestrial cell within the boundary area; determine that the fourth terrestrial cell is associated with the first cluster; and handover the connection from the second terrestrial cell to the fourth terrestrial cell anchored with the first central unit dedicated for the first cluster.

After the user device is connected to the non-terrestrial cell, the processor may be configured to further execute the computer instructions to: determine that the user device has moved into the boundary area of the wireless network; determine that the user device has moved into a coverage area of a fourth terrestrial cell within the boundary area; determine that the fourth terrestrial cell is associated with the second cluster; and handover the connection from the non-terrestrial cell to the fourth terrestrial cell anchored with the second central unit dedicated for the second cluster.

The processor may be configured to connect the user device to the first terrestrial cell by further executing the computer instructions to: anchor the connection between the user device and the wireless network with a first central unit specific for the first terrestrial cell.

A non-transitory processor-readable storage medium may be summarized as storing computer instructions that, when executed by a processor, cause the processor to perform actions, the actions comprising: determining a location of a user device attempting to connect to a wireless network that includes a terrestrial-only coverage area, a non-terrestrial-only coverage area, and a boundary area between the terrestrial-only coverage area and the non-terrestrial-only coverage area. In response to determining that the user device is located within the terrestrial-only coverage area, connecting the user device to a first terrestrial cell within the terrestrial-only coverage area. In response to determining that the user device is located within the boundary area: selecting a second terrestrial cell in the boundary area; identifying a first cluster of terrestrial cells within the boundary area associated with the second terrestrial cell; and connecting the user device to the second terrestrial cell based on the first cluster. And in response to determining that the user device is located within the non-terrestrial-only coverage area: identifying a third terrestrial cell within the boundary area closest to the user device; identifying a second cluster of terrestrial cells within the boundary area associated with the third terrestrial cell; and connecting the user device to the non-terrestrial cell based on the second cluster.

Connecting the user device to the second terrestrial cell based on the first cluster may further comprise: anchoring the connection between the user device and the wireless network with a central unit associated with the first cluster and a distributed unit for the first terrestrial cell.

In some embodiments, after connecting the user device to the second terrestrial cell, the actions may further comprise: determining that the user device has moved into the non-terrestrial-only coverage area; and handing over the connection from the second terrestrial cell to the non-terrestrial cell anchored with the central unit associated with the first cluster and a second distributed unit for the non-terrestrial cell.

In other embodiments, after connecting the user device to the second terrestrial cell, the actions may further comprise: determining that the user device has moved into a coverage area of a fourth terrestrial cell within the boundary area; determining that the fourth terrestrial cell is associated with the first cluster; and handing over the connection from the second terrestrial cell to the fourth terrestrial cell anchored with the central unit associated with the first cluster and a second distributed unit for the fourth terrestrial cell.

Connecting the user device to the non-terrestrial cell based on the second cluster may further comprise: anchoring the connection between the user device and the wireless network with a central unit associated with the second cluster and a distributed unit for the non-terrestrial cell.

In some embodiments, after connecting the user device to the non-terrestrial cell, the actions may further comprise: determining that the user device has moved into the boundary area of the wireless network; determining that the user device has moved into a coverage area of a fourth terrestrial cell within the boundary area; determining that the fourth terrestrial cell is associated with the second cluster; and handing over the connection from the non-terrestrial cell to the fourth terrestrial cell anchored with the central unit associated with the second cluster and a second distributed unit for the fourth terrestrial cell.

In other embodiments, after connecting the user device to the non-terrestrial cell, the actions may further comprise: determining that the user device has moved into the boundary area of the wireless network; determining that the user device has moved into a coverage area of a fourth terrestrial cell within the boundary area; determining that the fourth terrestrial cell is associated with a third cluster; and handing over the connection from the non-terrestrial cell to the fourth terrestrial cell anchored with a second central unit associated with the third cluster and a second distributed unit for the fourth terrestrial cell.

Connecting the user device to the first terrestrial cell may further comprise: anchoring the connection between the user device and the wireless network with a central unit specific for the first terrestrial cell and a distributed unit specific for the first terrestrial cell.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving a connection request from a user device to connect to a wireless network;
determining a location of the user device;
in response to determining that the user device is located within a terrestrial-only coverage area of the wireless network,
connecting the user device to a first terrestrial cell within the terrestrial-only coverage area;
in response to determining that the user device is located within a boundary area associated with the terrestrial-only coverage area and a non-terrestrial-only coverage area of a non-terrestrial cell of the wireless network:
selecting a second terrestrial cell in the boundary area for the connection request of the user device;
identifying a first cluster of terrestrial cells associated with the second terrestrial cell; and
connecting the user device to the second terrestrial cell based on the first cluster;
in response to determining that the user device is located within the non-terrestrial-only coverage area of the wireless network:
identifying a second cluster of terrestrial cells associated with a third terrestrial cell within the boundary area closest to the user device; and
connecting the user device to the non-terrestrial cell based on the second cluster; and
after connecting the user device to the non-terrestrial cell:
determining that the user device has moved into the boundary area of the wireless network;
determining that the user device has moved into a coverage area of a fourth terrestrial cell within the boundary area;
determining that the fourth terrestrial cell is associated with the second cluster; and
handing over the connection from the non-terrestrial cell to the fourth terrestrial cell based on the second cluster.

2. The method of claim 1, wherein connecting the user device to the second terrestrial cell based on the first cluster further comprises:
anchoring the connection between the user device and the wireless network with a central unit associated with the first cluster and a distributed unit for the first terrestrial cell.

3. The method of claim 2, further comprising:
after connecting the user device to the second terrestrial cell:
determining that the user device has moved into the non-terrestrial-only coverage area of the wireless network; and
handing over the connection from the second terrestrial cell to the non-terrestrial cell anchored with the central unit associated with the first cluster and a second distributed unit for the non-terrestrial cell.

4. The method of claim 2, further comprising:
after connecting the user device to the second terrestrial cell:
determining that the user device has moved into a coverage area of a fifth terrestrial cell within the boundary area;
determining that the fifth terrestrial cell is associated with the first cluster; and
handing over the connection from the second terrestrial cell to the fifth terrestrial cell anchored with the central unit associated with the first cluster and a second distributed unit for the fifth terrestrial cell.

5. The method of claim 1, wherein connecting the user device to the non-terrestrial cell based on the second cluster further comprises:
anchoring the connection between the user device and the wireless network with a central unit associated with the second cluster and a distributed unit for the non-terrestrial cell.

6. The method of claim 5, further comprising:
wherein handing over the connection from the non-terrestrial cell to the fourth terrestrial cell based on the second cluster includes anchoring the connection between the user device and the fourth terrestrial cell with the central unit associated with the second cluster and a second distributed unit for the fourth terrestrial cell.

7. The method of claim 1, wherein connecting the user device to the first terrestrial cell further comprises:
anchoring the connection between the user device and the wireless network with a central unit specific for the first terrestrial cell and a distributed unit specific for the first terrestrial cell.

8. A system, comprising:
a memory configured to store computer instructions; and
a processor configured to execute the computer instruction to:
receive a connection request from a user device to connect to a wireless network;
determine a location of the user device;
in response to the user device being located within a terrestrial-only coverage area of the wireless network,
connect the user device to a first terrestrial cell within the terrestrial-only coverage area;
in response to the user device being located within a boundary area between the terrestrial-only coverage area and a non-terrestrial-only coverage area of a non-terrestrial cell of the wireless network:
select a second terrestrial cell in the boundary area for the connection request of the user device;
identify a first cluster of terrestrial cells associated with the second terrestrial cell; and
connect the user device to the second terrestrial cell anchored with a first central unit dedicated for the first cluster; and
in response to the user device being located within the non-terrestrial-only coverage area of the wireless network:
identify a second cluster of terrestrial cells associated with a third terrestrial cell within the boundary area closest to the user device; and
connect the user device to the non-terrestrial cell anchored with a second central unit dedicated for the second cluster;
after the user device is connected to the non-terrestrial cell:
determine that the user device has moved into the boundary area of the wireless network;
determine that the user device has moved into a coverage area of a fourth terrestrial cell within the boundary area;
determine that the fourth terrestrial cell is associated with the second cluster; and
handover the connection from the non-terrestrial cell to the fourth terrestrial cell anchored with the second central unit dedicated for the second cluster.

9. The system of claim 8, wherein the processor is configured to further execute the computer instructions to:
after the user device is connected to the second terrestrial cell:
determine that the user device has moved into the non-terrestrial-only coverage area of the wireless network; and
handover the connection from the second terrestrial cell to the non-terrestrial cell anchored with the first central unit dedicated for the first cluster.

10. The system of claim 8, wherein the processor is configured to further execute the computer instructions to:
after the user device is connected to the second terrestrial cell:
determine that the user device has moved into a coverage area of a fifth terrestrial cell within the boundary area;
determine that the fifth terrestrial cell is associated with the first cluster; and
handover the connection from the second terrestrial cell to the fifth terrestrial cell anchored with the first central unit dedicated for the first cluster.

11. The system of claim 8, wherein the processor is configured to connect the user device to the first terrestrial cell by further executing the computer instructions to:
anchor the connection between the user device and the wireless network with a first central unit specific for the first terrestrial cell.

12. A non-transitory processor-readable storage medium that stores computer instructions that, when executed by a processor, cause the processor to perform actions, the actions comprising:
determining a location of a user device attempting to connect to a wireless network that includes a terrestrial-only coverage area, a non-terrestrial-only coverage area, and
a boundary area between the terrestrial-only coverage area and the non-terrestrial-only coverage area;

in response to determining that the user device is located within the terrestrial-only coverage area,
connecting the user device to a first terrestrial cell within the terrestrial-only coverage area;
in response to determining that the user device is located within the boundary area:
selecting a second terrestrial cell in the boundary area;
identifying a first cluster of terrestrial cells within the boundary area associated with the second terrestrial cell; and
connecting the user device to the second terrestrial cell based on the first cluster;
in response to determining that the user device is located within the non-terrestrial-only coverage area:
identifying a third terrestrial cell within the boundary area closest to the user device;
identifying a second cluster of terrestrial cells within the boundary area associated with the third terrestrial cell; and
connecting the user device to the non-terrestrial cell based on the second cluster; and
after connecting the user device to the non-terrestrial cell:
determining that the user device has moved into the boundary area of the wireless network;
determining that the user device has moved into a coverage area of a fourth terrestrial cell within the boundary area;
determining that the fourth terrestrial cell is associated with the second cluster; and
handing over the connection from the non-terrestrial cell to the fourth terrestrial cell based on the second cluster.

13. The non-transitory processor-readable storage medium of claim 12, wherein connecting the user device to the second terrestrial cell based on the first cluster further comprises:
anchoring the connection between the user device and the wireless network with a central unit associated with the first cluster and a distributed unit for the first terrestrial cell.

14. The non-transitory processor-readable storage medium of claim 13, the actions further comprising:
after connecting the user device to the second terrestrial cell:
determining that the user device has moved into the non-terrestrial-only coverage area; and
handing over the connection from the second terrestrial cell to the non-terrestrial cell anchored with the central unit associated with the first cluster and a second distributed unit for the non-terrestrial cell.

15. The non-transitory processor-readable storage medium of claim 13, the actions further comprising:
after connecting the user device to the second terrestrial cell:
determining that the user device has moved into a coverage area of a fifth terrestrial cell within the boundary area;
determining that the fifth terrestrial cell is associated with the first cluster; and
handing over the connection from the second terrestrial cell to the fourth fifth terrestrial cell anchored with the central unit associated with the first cluster and a second distributed unit for the fourth terrestrial cell.

16. The non-transitory processor-readable storage medium of claim 12, wherein connecting the user device to the non-terrestrial cell based on the second cluster further comprises:
anchoring the connection between the user device and the wireless network with a central unit associated with the second cluster and a distributed unit for the non-terrestrial cell.

17. The non-transitory processor-readable storage medium of claim 16, the actions further comprising:
wherein handing over the connection from the non-terrestrial cell to the fourth terrestrial cell based on the second cluster includes anchoring the connection between the user device and the fourth terrestrial cell with the central unit associated with the second cluster and a second distributed unit for the fourth terrestrial cell.

18. The non-transitory processor-readable storage medium of claim 12, wherein connecting the user device to the first terrestrial cell further comprises:
anchoring the connection between the user device and the wireless network with a central unit specific for the first terrestrial cell and a distributed unit specific for the first terrestrial cell.

* * * * *

UNITED STATES PATENT AND TRADEMARK OFFICE
CERTIFICATE OF CORRECTION

PATENT NO. : 12,477,435 B2  
APPLICATION NO. : 18/298651  
DATED : November 18, 2025  
INVENTOR(S) : Mehdi Alasti et al.

Page 1 of 1

It is certified that error appears in the above-identified patent and that said Letters Patent is hereby corrected as shown below:

On the Title Page

<u>Item (54) and In the Specification, Column 1, Lines 1-3:</u>
"O-RAN BASED DYNAMIC TERRESTRIAL AND NON-TERRESTRIAL INTRA g_Node_B HANDOVER"
Should read:
--O-RAN BASED DYNAMIC TERRESTRIAL AND NON-TERRESTRIAL INTRA G_NODE_B HANDOVER--.

In the Claims

<u>Column 20, Claim 15, Line 17:</u>
"to the fourth fifth terrestrial"
Should read:
--to the fifth terrestrial--.

Signed and Sealed this
Tenth Day of February, 2026

John A. Squires
*Director of the United States Patent and Trademark Office*